United States Patent [19]

Matthews et al.

[11] Patent Number: 5,003,239
[45] Date of Patent: Mar. 26, 1991

[54] PERISTALTIC PUMP MONITORING DEVICE

[75] Inventors: Joseph B. Matthews, Grayslake; George A. Bowman, Vernon Hills, both of Ill.

[73] Assignee: Baxter International Inc., Deerfield, Ill.

[21] Appl. No.: 463,716

[22] Filed: Jan. 11, 1990

[51] Int. Cl.$^5$ .............................................. G02B 26/00
[52] U.S. Cl. ..................................... 318/600; 335/272; 350/274; 318/565
[58] Field of Search ............... 318/254, 480, 600, 601, 318/602, 603, 565; 250/231.13, 231.14, 231.15, 231.16, 231.17, 231.18, 232, 233; 335/272; 350/273, 274, 275, 374; 356/27; 360/77.02, 77.03

[56] References Cited

U.S. PATENT DOCUMENTS

| | | | |
|---|---|---|---|
| 3,423,591 | 1/1969 | Schrempp | 250/231.14 |
| 3,957,377 | 5/1976 | Hutchinson | 350/274 X |
| 4,107,595 | 8/1978 | Campe . | |
| 4,233,592 | 11/1980 | Leichle | 250/231.14 X |
| 4,263,506 | 4/1981 | Epstein | 250/231.17 X |
| 4,342,025 | 7/1982 | Spalti et al. | 250/231.18 X |
| 4,360,769 | 11/1982 | Selkey et al. . | |
| 4,423,958 | 1/1984 | Schmitt | 250/231.14 X |
| 4,602,882 | 7/1986 | Akazawa . | |
| 4,628,239 | 12/1986 | Everett, Jr. . | |
| 4,683,410 | 7/1987 | Kressirer et al. . | |
| 4,687,981 | 8/1987 | Okada . | |
| 4,736,187 | 4/1988 | Kibrick et al. | 250/231.14 X |
| 4,803,354 | 2/1989 | Onodera et al. | 250/231.16 |
| 4,869,646 | 9/1989 | Gordon et al. | 417/18 |
| 4,899,093 | 2/1990 | Gleim | 318/480 X |

FOREIGN PATENT DOCUMENTS

| | | | |
|---|---|---|---|
| 59-48616 | 3/1984 | Japan | 250/231.13 |
| 59-224516 | 12/1984 | Japan | 250/231.13 |
| 60-47916 | 3/1985 | Japan | 250/231.17 |
| 60-47917 | 3/1985 | Japan | 250/231.13 |

OTHER PUBLICATIONS

Ishikawajima-Harima Eng. Rev. (Japan), "IHI Rotary Encoder", vol. 16, No. 6 (Nov. 1976).

Primary Examiner—Bentsu Ro
Attorney, Agent, or Firm—Paul E. Schaafsma; Paul C Flattery; Bradford R. L. Price

[57] ABSTRACT

An encoder wheel (60) is provided for monitoring a peristaltic pump (20). The encoder wheel (60) provides a plurality of equispaced sectors (62) and a reference sector (66) provided at the outer radius of the encoder wheel (60). A vane slit (68) is provide radially offset from the sectors (62,66). A pair of optical couplers (72,74) are provided to read the sectors (62,66) and the vane slit (68).

10 Claims, 3 Drawing Sheets

PERISTALTIC PUMP MONITORING DEVICE

FIELD OF THE INVENTION

The present invention relates in general to peristaltic pumps and in particular to improved monitoring of the performance of such peristaltic pumps.

BACKGROUND OF THE INVENTION

Administration of intravenous fluids to a patient is well known in the art. Typically, a solution such as saline, glucose or electrolyte in a glass or flexible container is fed to a patient's venous access site via a length of flexible plastic tubing such as polyvinyl chloride (PVC) tubing. The rate of flow of the fluid is controlled by a roller clamp which is adjusted to restrict the flow lumen of the tubing until the desired flow rate is obtained.

Flow from the container to the patient may also be regulated by means other than a roller clamp. It is becoming more and more common to use an electronically controlled pump. One type of pump that is used for intravenous fluid administration is a peristaltic-type pump.

Use of peristaltic pumping action is particularly well suited for the medical field. This is because peristaltic pumping action can be applied externally of the tubing carrying the intravenous fluid. This maintains the sterile condition of the intravenous fluid within the tubing while imparting fluid propulsion on the fluid. The peristaltic pumping action can also be applied at any point on the tubing.

In a common type of peristaltic pump used in the medical field, a driving motor is connected to an array of cams angularly spaced from each other. The cams in turn drive cam followers which are connected to corresponding pressure fingers. These elements cooperate to impart a linear wave motion on the pressure fingers. A pressure plate is secured juxtaposed to and spaced from the pressure fingers. The pressure plate holds the tubing against the reciprocating pressure fingers to impart the wave motion on the tubing to propel the fluid. Alternatively, the driving motor drives a rotary-type peristaltic pump in which a plurality of rollers contact the tubing to impart fluid propulsion. A pressure plate holds the tubing adjacent to the rollers.

In a preferred embodiment of peristaltic pumps, the driving motor is a stepping motor which rotates in small increments or steps. While a stepping motor rotating at a high rate of speed gives a visual impression that the rotation is constant, the stepping motor in fact turns through a series of small angular increments or steps which are followed by a brief period of rest. In stepping motors utilized in peristaltic pumps in the medical field, these small angular steps can range from about 0.36° to 7.2° and in a preferred embodiment are about 1.8°. This results in a series of steps of the shaft between 1000 and 50 per revolution or, in the preferred embodiment, about 200 steps per revolution.

Accurate monitoring of the pumping action of such a peristaltic pump is desirable in a number of areas. For example, peristaltic pumps in the art have the potential for slippage during the pumping period. Slippage occurs when excessive torque requirements are placed on the driving motor so that rotational movement does not occur even though power is being applied to the motor. Slippage can be caused by, for example, motor friction, tubing variances and peak torque requirements, which can vary greatly during a peristaltic pumping cycle. If slippage is detected, it can be solved by adjusting power supplied to the motor to compensate for the torque variation.

Another area in which accurate monitoring of the pumping action is desirable is in the measurement of the length of time and number of rotations that the pump incurs. This is important to determine flow rates as well as to detect excessive occlusion pressures and air embolisms.

Still another area in which accurate monitoring is important is in monitoring the direction and rotation of the pump. Peristaltic pumps which are driven by stepping motors can move in an abnormal direction as a result of, for example, improper application of the driving pulse sequence due to parts failure or the application of a different pulse width or frequency modulation sequence to drive the motor. When such abnormal operation occurs, it is desirable to signal such abnormal operation so correction can be made or to correct such abnormal operation by adjusting the pulse sequence.

What would thus be desirable would be a peristaltic pump which could efficiently monitor the operation of the pumping action, signal power adjustment when slippage occurs, prevent abnormal motor rotation and improve accuracy by detecting rotation in small sector increments. This system also should be economical and reliable. The present invention provides such a device.

SUMMARY OF THE INVENTION

The present invention provides a peristaltic pump having an encoder wheel for monitoring the activity of the pump. The encoder wheel includes a plurality of equispaced slits on the outer circumference which work in conjunction with an optical coupler to provide a digital reading to a digital processor. A vane slit is also provided on the wheel radially spaced from the plurality of slits on the outer circumference which works in conjunction with a second optical coupler to provide reference input to the digital processor.

In a preferred embodiment, a reference sector is provided on the outer circumference which is a width different than the plurality of equispaced slits. In a preferred embodiment, the vane slit and the reference slit are coordinated such that the digital processor can coordinate the reference read and the vane read to monitor the pumping action.

DETAILED DESCRIPTION OF A PREFERRED EMBODIMENT

Figure 1:
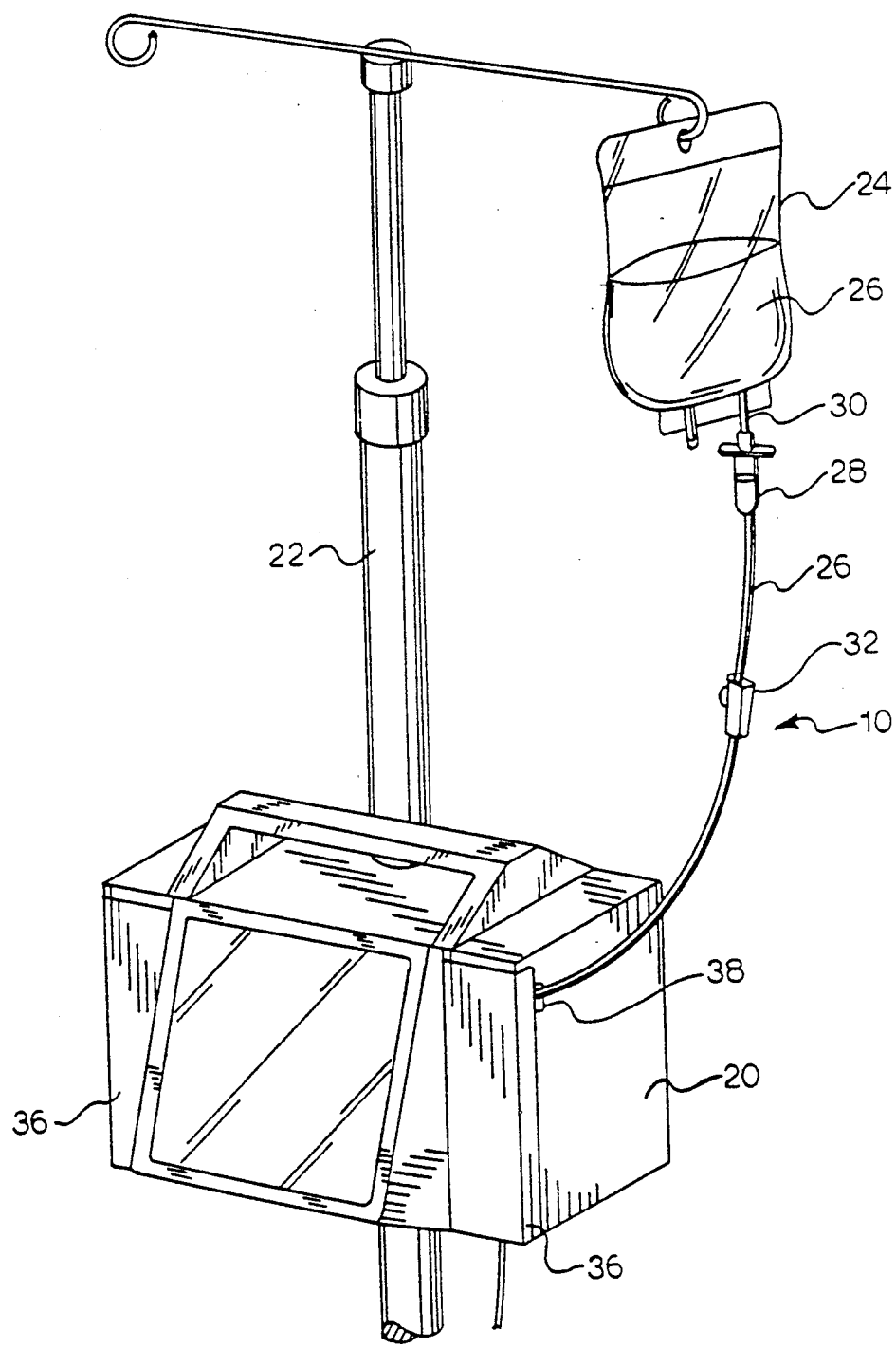
FIG. 1 is a perspective view of an intravenous pump set utilizing a peristaltic pumping apparatus.

FIG. 1 is an illustration of an intravenous administration set up using a pump and a source of intravenous fluid such as a flexible container. Pump 20, which is provided with a pump operating mechanism and operating electronics is mounted on an I.V. stand 22 which also serves as a support for the intravenous fluid container 24. Container 24, which typically contains a fluid 26 such as saline that is continually administered, is also suspended from stand 22.

An administration set 10 provides a flow path from container 24 to the patient via pump 20. Set 10 includes a segment of flexible plastic tubing 26 such as polyvinyl chloride (PVC) tubing.

Tubing 26 at its proximal end is attached to a drip chamber 28 that in turn is attached via a spike (not shown) to an outlet port 30 of container 24. A clamping means such as a roller clamp 32 is positioned on tubing 26 at a point between pump 20 and container 24. Tubing 26 has connected at its distal end means for connecting set 10 to a vein access device, such as a catheter or needle (not shown).

Pump 20 includes a hinged door 36 which covers the peristaltic pumping apparatus hardware. To set up the pump 20, door 36 is opened, tubing 26 is inserted into the peristaltic pumping apparatus as described in detail below, door 36 is closed, and pump 20 is activated. Pump 20 also defines apertures 38 at the upper and lower (not shown) peripheries of the door 36 through which the tubing 26 extends when the door 36 is closed.

While the embodiment depicted in FIG. 1 includes a dual drive peristaltic pump, the present invention contemplates use of any number of pump drives in a single peristaltic pump.

Figure 2:
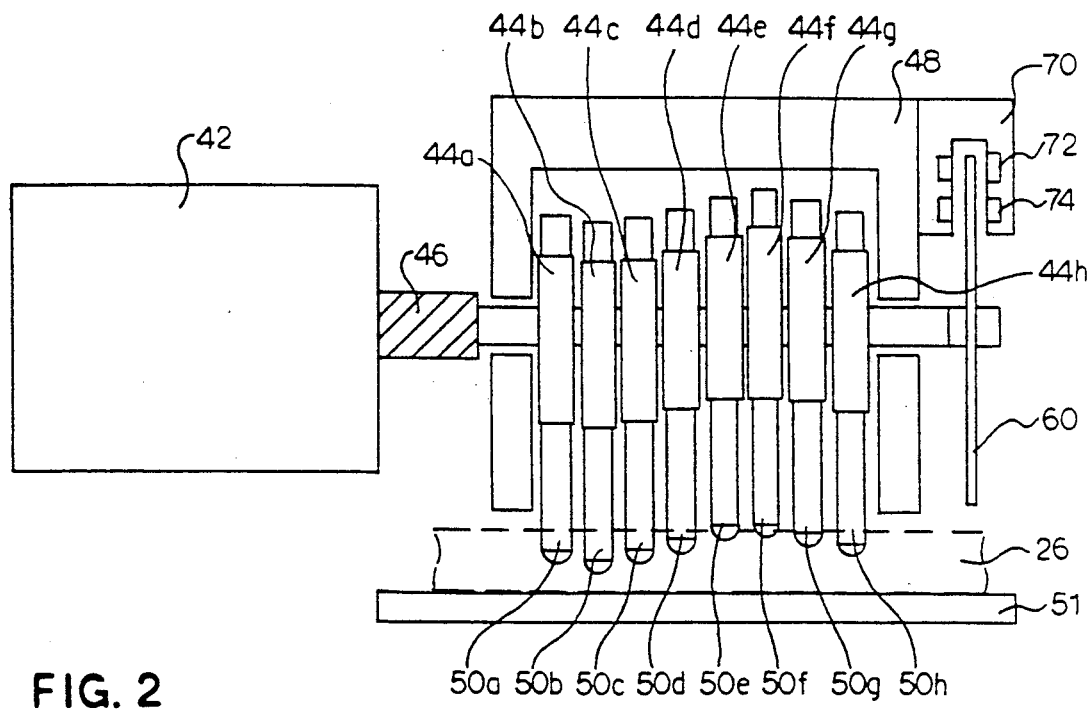
FIG. 2 is a general schematic of a peristaltic pressure finger type pump made in accordance with the principles of the present invention.

Referring to FIG. 2, a general schematic of a peristaltic pumping apparatus is seen. A driving motor 42 is connected to a plurality of cams 44a-h via a drive shaft 46. While in the embodiment depicted in FIG. 2 eight cams are utilized, any number of cams are contemplated in the present invention. Each cam 44 is angularly displaced from the adjacent cam. The plurality of angularly displaced cams 44a-h are journaled in housing 48 which enables rotation in conjunction with the drive shaft 46.

A plurality of reciprocating pressure fingers 50a-h are provided, the number of which corresponds to the number of cams 44. Each pressure finger 50 cooperates with a corresponding cam 44 by acting as a cam follower to reciprocally drive the pressure finger 50. The rotational movement of the drive shaft 46 is thus converted into a linear wave movement of the plurality of reciprocating pressure fingers 50a-h.

A pressure plate 51 is provided located juxtaposed to the pressure fingers 50 and extending parallel to the axis of the cams. Tubing 26 is contained between the pressure fingers 50 and the pressure plate 51. Fluid propulsion is effectuated by the pressure fingers 50a-h squeezing the tubing 26 in the linear wave movement imparted by the angular orientation of the cams 44a-h.

Figure 3:
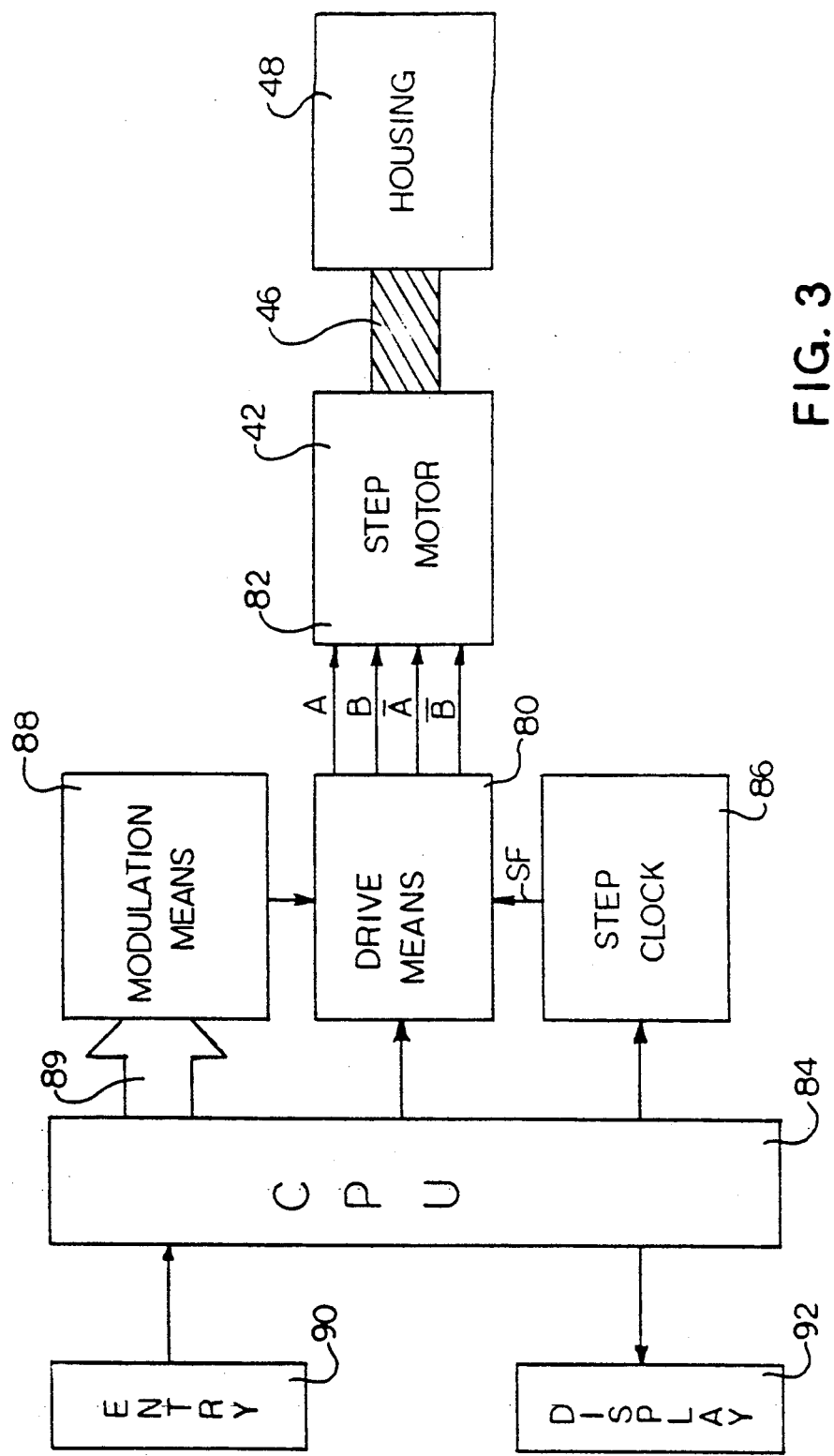
FIG. 3 is a block diagram of the operating electronics of a peristaltic pump made in accordance with the principles of the present invention.

Referring now to FIG. 3, a schematic of a preferred embodiment of a device in accordance with the principles of the present invention is seen. As previously seen, the pumping mechanism is provided in housing 48. The pumping mechanism is driven by driving motor 42 via drive shaft 46. The driving motor 42 is a stepping motor which can preferably have 200 steps per revolution and a four step cycle. The stepping motor 42 is driven by drive means 80 which generates four signals A, B, A, B to drive the stepping motor 42. Interfaced between the drive means 80 and the stepping motor 42 are power monitoring means 82 which monitor the power consumption of the stepping motor 42.

The drive means 80 is set by input from a central processing unit 84. The central processing unit 84 also inputs into a step clock 86, the output of which is inputted into the driving means 80. The step clock 86 provides means for generating a step clock signal SF which is utilized by the drive means 80.

A modulation means 88 for modulating the drive signal to conserve power can also be provided. The modulation means 88 is set by the central processing unit 84 over data bus 89. Various fusion parameters are inputted into the central processing unit 84 by the user via an entry keyboard 90 while a display 92 is preferably provided to display information such as infusion rate. U.S. Pat. Application Ser. No. 07/463,644 entitled "PERISTALTIC PUMP MOTOR DRIVE" which is being filed concurrently with this application and which disclosure is incorporated herein by this reference more particularly describes operation of these elements.

Figure 4:
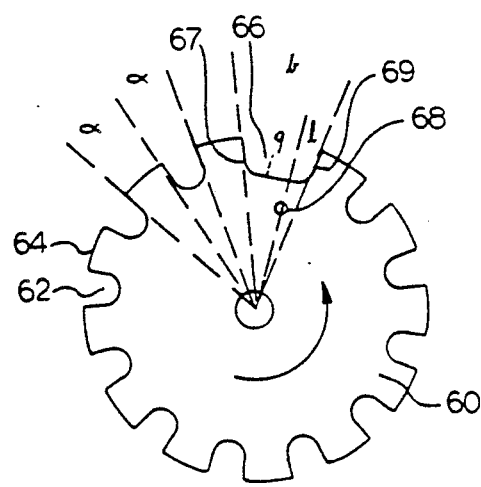
FIG. 4 is perspective view of an encoder wheel made in accordance with the principles of the present invention.

Referring to FIG. 4, an encoder wheel made in accord with the principles of the present invention is designated generally by 60. The encoder wheel 60 is mounted on and rotates in conjunction with drive shaft 46.

In the preferred embodiment of peristaltic pumping apparatus, stepping motors having 200 steps per revolution utilizing full step drive and a four step cycle. Each step thus represents 1.8° of the full revolution.

The encoder wheel is provided with a plurality of equispaced slits or sectors 62 on the outer circumference. Between each sector 62 is a plurality of equispaced portions of the encoder wheel 60 referred to herein as a blocker 64. The sectors 62 act to pass light while the blocker 64 acts to block light. Blocked light is assigned a digital logic high or 1 reference while passed light is assigned a digital logic low or 0 reference.

Each sector 62 is preferably 8 steps wide. Thus, each sector 62 s preferably 14.4° wide (alpha). Likewise, each blocker 64 between each sector 62 is preferably 8 steps wide resulting in a width of 14.4° (alpha).

A reference sector 66 is provided which has a width different than the width of equispaced sectors 62. Reference sector 64 includes a leading edge 67 and a trailing edge 69 as referenced by the direction of rotation of encoder wheel 60. In the preferred embodiment, the reference sector 66 is 16 steps wide. Thus, in the preferred embodiment, the referenced sector 66 is 28.8° (beta). It is thus seen that the preferred embodiment comprises eleven equispaced sectors 62, twelve equispaced blockers 64, and one reference sector 66.

The encoder wheel 60 additionally includes an interior slit or vane 68. The vane 68 is offset from the radius of the plurality of sectors 62, 66 such that a separate optical reading of the vane 68 can be effectuated. In the preferred embodiment, the vane 68 is located six steps or 10.8° (lambda) from the trailing edge 69 of the reference sector 66.

Referring again to FIG. 2, the encoder wheel 60 is seen attached to the drive shaft 46. Contained surrounding the outer circumference of the encoder wheel 60 is a U-shaped housing 70. The U-shaped housing houses a pair of optical couplers 72, 74. The first optical coupler 72 is oriented to correspond with the plurality of blocker segments 64 on the encoder wheel 60 thus acting to digitally read the blocker 64 and sector 62, 66 segments. The second optical coupler 74 is oriented radially offset from the radius of the plurality of sectors 62, 66 to read the vane 68.

The readings taken by optical sensors 72, 74 are controlled by a pump controlling microprocessor or central processing unit 84. The digital reading of optical couplers 72, 74 are inputted into a digital processor contained in the microprocessor.

As will be appreciated by those skilled in the art, the exact configuration of the present embodiment can be readily altered while maintaining the desired effect of the present device. For instance, the portion of vane 68 and optical couplers 72, 74 can be moved to an equivalent position either radially or axially which still provides the desired effect. Additionally, the present device can be coordinated with the use of stepping motors having different size steps. Of course, these various configurations are contemplated within the scope of the present invention.

Referring to both FIGS. 2 and 3, operation of the present device will be described in the illustrated embodiment in which optical couplers 72, 74 are oriented radially in series. The digital processor is programmed to measure the light transmission as the motor is stepped electronically every four steps or every 7.2°. Because each equispaced sector 62 in the preferred embodiment is eight steps or 14.4°, each sector 62 represents in digital logic 00. Likewise, because each blocker 64 is eight steps or 14.4°, each blocker 64 represents 11 in digital logic. Reference sector 66 is 16 steps or 28.8° wide or in digital logic is 0000. Thus, normal rotation of the drive shaft 46 results in a digital logic progression of the following,

001100110011 ... 0011000011 in which the four adjacent low signals 0000 represents the reference sector 60.

Because of the alignment of the magnetic poles in stepping motors, stepping motor slippage always results in a loss of 4 steps or 7.2°. Thus, each instance of slippage results in a single digital logic reading. By monitoring the digital logic progression of encoder wheel 60, when abnormal digital readings such as, for example,

110011101110 occur, slippage is detected. Thus, use of the blocker 64 and sectors 62 on the encoder wheel provide means for detecting motor slippage.

Additionally, vane 68 can be monitored to determine when one revolution of drive motor 42 has occurred By utilizing a microprocessor to monitor the time of revolution of the vane 68 in this manner, means are provided for determining flow rate calculations. If abnormal flow rate is detected, an alarm can be sounded. Furthermore, by initially permitting a slippage condition and then adjusting the power to prevent it, the pump can operate as efficiently as possible.

Further, as previously seen vane indicator 68 is offset from the trailing edge 69 of the reference sector 66 by six steps, or 10.8°. Thus, referring to FIG. 3, lambda is 10.8° and gamma is 18°. Angle lambda thus represents one low digital logic read while angle gamma represents two low digital logic reads. Thus, by utilizing vane indicator 68 to reset the digital monitor, proper rotation in the counter clockwise direction for one complete revolution results in a digital logic progression of:

011001100 ... 11001100

In the event of abnormal drive shaft rotation in a clockwise direction, one complete revolution results in a digital logic progression of:

0011001100 ... 11001100

It is seen that utilizing the vane indicator 68 in conjunction with the reference sector 66 provides means for determining the directional rotation of the motor by the microprocessor.

Thus, the digital readings generated by the optical couplers 72, 74 in conjunction with the sectors 62, 66, blocker 64, and vane 68 can be monitored by the microprocessor. If slippage occurs, the microprocessor can increase power supplied to drive motor 42 and, upon receiving a signal of the beginning of a new pump cycle by vane indicator 68, decrease power to resume the pumping cycle.

Additionally, because of the novel arrangement of vane 68 and sector 62 indicators, and small variance of up to 1.8 degrees will not be detected as a false reading. This is because such small variances will not effect the digital readings from the encoder wheel 60. This is particularly valuable as variances of between −1.8° and +1.8° commonly occur in pumping mechanisms in the art. Of course, it will be appreciated by those in the art that if more or less precise monitoring is desired, the arrangement of the vane 68 and sector 62 indicators can be adjusted accordingly.

It is thus seen that utilizing the present invention, abnormal pump action can be detected within one or two sectors, therefore allowing virtually immediate detection of excessive torques or other variances. By utilizing an appropriate microprocessor as known in the art, power compensation can be applied at the next sector. Thus, nearly instantaneous corrections can be applied to the flow rate.

It should be understood that various changes and modifications to the preferred embodiments described herein will be apparent to those skilled in the art. For example, the principles of the present invention can be applied as well to rotary type peristaltic pumps. Such changes and modifications can be made without departing from the spirit and scope of the present invention and without diminishing its attendant advantage. It is, therefore, intended that such changes and modifications be covered by the appended claims.

What is claimed is:

1. An encoder wheel for use in monitoring the rotation of a drive shaft of a driving motor in a pump, comprising:

means for detecting motor slippage, the means for detecting motor slippage including a plurality of equispaced sectors, the sectors being in cooperative relationship with a first optical coupler to provide optical readings to the first optical coupler;

means for determining the rate of movement of the drive shaft, the means for determining the rate of movement including a vane slit, the vane slit being in cooperative relationship with a second optical coupler to provide an optical reading to the second optical coupler; and means for determining the directional rotation of the drive shaft, the means for determining the directional rotation including a reference sector provided in cooperative relationship with the first optical coupler to provide an optical reading to the first optical coupler, the optical reading provided by the reference sector being distinct from the optical reading provided by the plurality of equispaced sectors.

2. The encoder wheel of claim 1 further including a center and wherein the plurality of equispaced sectors and the reference sector are provided at a constant radius from the center of the encoder wheel.

3. The encoder wheel of claim 2 wherein the vane slit is provided at a radius from the center of the encoder wheel different from the radius of the sectors.

4. The encoder wheel of claim 2 further including an outer circumference and wherein the plurality of equispaced sectors and the reference sector are provided at the outer circumference of the encoder wheel.

5. The encoder wheel of claim 1 wherein the means for detecting motor slippage further includes a microprocessor or central processing unit.

6. The encoder wheel of claim 5 wherein the means for detecting motor slippage further includes a digital processor.

7. The encoder wheel of claim 1 wherein the means for determining the rate of movement of the drive shaft further includes a microprocessor or central processing unit.

8. The encoder wheel of claim 7 wherein the means for determining the rate of movement further includes a digital processor.

9. The encoder wheel of claim 1 wherein the means for determining the directional rotation of the drive shaft further includes a microprocessor or central processing unit.

10. The encoder wheel of claim 9 wherein the means for determining the directional rotation of the drive shaft further includes a digital processor.

* * * * *